United States Patent [19]
Navarro et al.

[11] Patent Number: 5,887,395
[45] Date of Patent: Mar. 30, 1999

[54] FIRESTOP SLEEVE

[75] Inventors: Mario Navarro, New Tripoli, Pa.;
William T. Seeley, Sicklerville, N.J.

[73] Assignees: International Protective Coatings Corp., Oakhurst, N.J.; Pyro-Tech Industries Inc., Hatfield, Pa.

[21] Appl. No.: 934,054

[22] Filed: Sep. 19, 1997

[51] Int. Cl.⁶ .................... B32B 9/00; B32B 3/02
[52] U.S. Cl. ............... 52/232; 428/192; 428/920; 428/921
[58] Field of Search ............... 428/99, 192, 920, 428/921; 52/232

[56] References Cited

U.S. PATENT DOCUMENTS

| | | | |
|---|---|---|---|
| 5,498,466 | 3/1996 | Navarro et al. | 428/408 |
| 5,566,706 | 10/1996 | Harpeneau | 137/152 |
| 5,597,090 | 1/1997 | Leahy | 222/1 |

*Primary Examiner*—Alexander Thomas
*Attorney, Agent, or Firm*—Charles Brodsky

[57] ABSTRACT

A firestop sleeve suitable for both concrete floor and gypsum wall-board assembly including a layer of intumescent composite forming a moldable putty with a restraining layer, for wrapping around a pipe extending through the concrete floor or through the wall-board, along with a plurality of bendable tabs for depression into the wrapped layer to hold the restraining layer in position during installation.

12 Claims, 1 Drawing Sheet

FIRESTOP SLEEVE

FIELD OF THE INVENTION

This invention relates to intumescent composites, in general and to a firestop sleeve incorporating a layer of intumescent composite for use in gypsum wallboard, and concrete floor, assemblies, in particular.

BACKGROUND OF THE INVENTION

As is described in U.S. Pat. No. 5,498,466, an intumescent firestop device is used to prevent fire from spreading from one room to another through an opening or aperture in a wall, floor or ceiling through which a pipe runs. As is there set forth, a conventional firestop device is typically wrapped around a pipe adjacent to the wall, floor or ceiling opening. If a fire then breaks out in the room, the intumescent material within the firestop device is intended to intumesce (i.e., expand) when the temperature reaches a certain level. With the expansion of the intumescent material being directed inward by the outer restraining layer of the firestop device, the result is a crushing of the pipe by the intumescing material—following from a softening of the pipe by the heat of the fire. The end result is described as a closing-off of the opening in the wall with a hard char, which is simultaneously fire resistant, thermal insulating, smoke depressing, and able to withstand the forces exerted by a stream of water from a fire hose.

U.S. Pat. No. 5,498,466 goes further in describing a preferred intumescent composite to produce these results, in which the composite is a moldable, non-curing putty. Also described there is a firestop device (incorporating the intumescent composite), which is installed around a pipe near a wall opening through which the pipe runs, with the intumescent composite exuding into the annular space between the pipe and the wall, floor, or ceiling opening in forming a cold-gas seal.

Experience has shown that such firestop device works quite well where the wall, floor or ceiling is of a concrete construction, where it is necessary only to firestop on one side. As FIG. 2 of that patent illustrates, for example, several screwing attachment tabs secure the device to the wall, floor or ceiling. In the embodiment there described, four attachment tabs are employed, pre-bent away about 90° from the layer of intumescent composite. Although performing quite well, installation of such firestop device entails a certain degree of labor intensiveness in attaching the tabs employed—but offers the further limitation in that when dealing with a gypsum wallboard assembly, for example, the installation needs to be repeated on the other side of the wall as well, thereby repeating the process and adding to its installation cost. Obviously, furthermore, if a construction requires firestopping on both sides of a concrete wall, floor or ceiling, the installation process needs to be duplicated on the opposite side as well, in similarly adding to the overall costs.

OBJECTS OF THE INVENTION

It is an object of the present invention, therefore, to provide a new and improved firestop device which continues, however, to use an intumescent composite which offers the characteristics of moldability and non-curing as characterize the intumescent composite described in the aforesaid U.S. Pat. No. 5,498,466.

It is also an object of the invention to provide a flexible firestop device that can be easily installed around a pipe, whether that pipe is passing through a wall, floor or ceiling.

It is another object of the invention to provide such a flexible firestop device that can be utilized in both gypsum wallboard and concrete floor assemblies.

It is yet a further object of the invention to provide such a flexible firestop device that can be installed easier, and less expensive, than is possible with the firestop device of U.S. Pat. No. 5,498,466.

SUMMARY OF THE INVENTION

As will become clear from a consideration of the following description, the firestop device of the present invention is in the form of a sleeve including a layer of intumescent composite forming as moldable putty with a restraining layer for wrapping around the pipe extending through the wallboard or through the concrete wall, floor or ceiling. As will be seen, the sleeve incorporates a restraining layer having an overlying poly-plastic band exhibiting top, bottom and opposing side edges, along with a layer of intumescent composite abutting the poly-plastic band. A plurality of tabs extend outwardly from the side edges of the poly-plastic band, and with both the restraining layer and the poly-plastic band being pliable for rolling toward one another when furled. With the layer of intumescent composite forming this moldable putty, and with the plurality of tabs being bendable to compress into the putty in holding the restraining layer in position, the firestop sleeve so formed can be fabricated of a length at least 8", to effectively form the hard char and cold-gas seal around the pipe on both sides of the wall, floor or ceiling in singular fashion. At the same time, and as will be set forth, the installation only requires a pushing of the firestop sleeve through the wall, floor or ceiling until it extends out substantially equal on either side, to be held in place without the need for attachment tabs in achieving the necessary securement. As will be appreciated by those skilled in the art, a significant reduction in labor intensive work is required, with an overall cost savings to the installation.

BRIEF DESCRIPTION OF THE DRAWING

These and other features of the present invention will be more clearly understood from a consideration of the following description, taken in connection with the accompanying drawing in which.

DETAILED DESCRIPTION OF THE DRAWING

Figure 1:
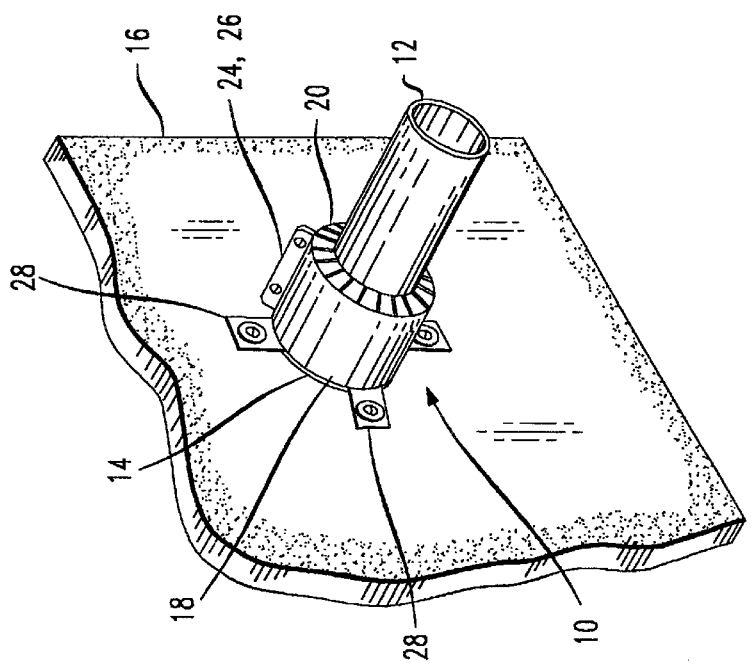
FIG. 1 shows the type of installation of the firestop device of the prior art U.S. Pat. No. 5,498,466, indicating the need for installation on first one side, and then on the opposite side, of the wall, floor or ceiling with which its firestop device operates.

Thus, referring now to FIG. 1, there is shown an intumescent firestop device 10 installed according to the teachings of U.S. Pat. No. 5,498,466. The firestop device 10 is wrapped around a pipe 12 adjacent to an aperture 14 in the wall, floor or ceiling 16. End portions 24 and 26 of a restraining layer for the firestop device are bolted together to secure the device 10. Attachment tabs 28 are bolted to the wall, floor or ceiling 16 to secure the firestop device 10. Support tabs 20 are included to hold the composite material 18 in place, atop its restraining layer. During its installation, some of the moldable composite material is exuded into the annular space between the restraining layer and the aperture 14 in the wall, floor or ceiling 16, thereby forming a cold-gas seal.

As will be understood from FIG. 1, this installation works quite well with a typical concrete wall, floor or ceiling, where the need exists only to firestop on one side. However, where the firestopping is required on both sides—as where the pipe extends through a gypsum wallboard—, the installation needs to be repeated on the other side of the wall 14 of FIG. 1. In other installations where firestopping needs to be provided even on both sides of a concrete wall, floor or ceiling, the installation process of FIG. 1 needs to be duplicated.

Figure 2:
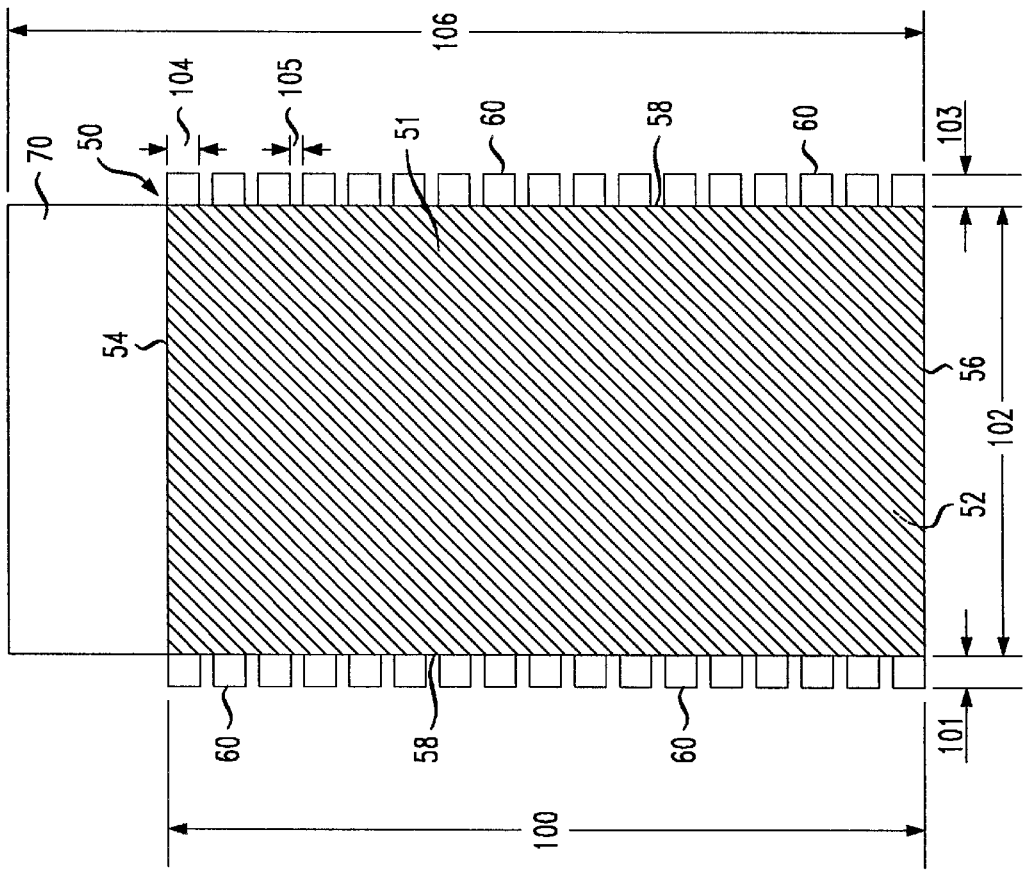
FIG. 2 is a plan view of the restraining layer of an intumescent fire sleeve according to a preferred embodiment of the present invention, which obviates the disadvantages inherent in the use of the firestop device of FIG. 1.

To obviate these problems, a new and improved firestop device, in the nature of a sleeve, is constructed in the manner shown in FIG. 2. In this construction, it is to be understood that the same type of intumescent component as was employed in the firestop device of U.S. Pat. No. 5,498,466 may be utilized, and the description in such patent as to the intumescent composite is herein incorporated by reference.

Thus, in FIG. 2, there is shown a plan view of restraining layer 50 of an intumescent firestop sleeve according to the invention, which may be formed from a sheet of 24-gauge galvanized steel although thicker or thinner sheets may be utilized. The restraining layer 50 has an overlying poly-plastic band 52 exhibiting top, bottom and opposing side edges 54, 56, 58 respectively. A layer of intumescent composite 51 abuts the poly-plastic band 52 and covers substantially the same area as that of the poly-plastic band. A plurality of tabs 60 extend outwardly from the side edges 58 of the band 52, and a distance substantially equal to the thickness of the intumescent layer. Also included is a further bendable tab 70 extending outwardly from the top edge 54 of the poly-plastic band 52—although in alternative arrangements, such bendable tab may outwardly extend from the bottom edge 56 of the band 52 instead. Dependent upon usage, it is also advantageous to have this bendable tab 70 extend from both the top and bottom edges 54, 56 of the poly-plastic band. In such alternative embodiments, as well, the restraining layer 50 can be fabricated of a material other than galvanized steel.

Furthermore, and in a preferred construction of the invention of FIG. 2, the plurality of tabs 60 are of a first width, which is several times less than the width of the bendable tab 70. Also, in accordance with the invention, the restraining layer 50, and the layer of intumescent composite which overlies it, are both of a length at least 8".

While Applicants do not wish to be limited to any particular set of dimensions, the following have proved useful in a preferred embodiment of the firestop sleeve:

Dimension 100 . . . 9.75 inch
Dimension 101 . . . ¼ inch
Dimension 102 . . . 8 inch
Dimension 103 . . . ¼ inch
Dimension 104 . . . ⅝ inch
Dimension 105 . . . ¼ inch
Dimension 106 . . . 13 inch With the layer of intumescent composite forming a bendable putty—of ¼" thickness, for example—and the restraining layer 50 and poly-plastic band 52 being thus selected pliable for rolling toward when another when furled, the plurality of tabs 60 thus become bendable to compress into the putty in holding the restraining layer 50 in position, over its length.

As previously mentioned, the firestop sleeve of the invention as thus described allows simple, inexpensive installation in a gypsum wallboard assembly, or in concrete wall, floor and ceiling assemblies. In installing a firestop sleeve of galvanized steel in a gypsum wallboard assembly, the following installation steps can be employed with advantageous results:

1. The firestop sleeve is wrapped around the pipe on one side of the wall, with the moldable putty side facing the pipe. The putty material will then join together, and the bare metal end 70 overlaps about 4 inches.
2. The firestop sleeve is then secured by wrapping electrical tape around it—although in other versions of use, the securement can be made using a pop rivet or a hose clamp.
3. The retaining tabs 60 are then bent around the firestop sleeve on both sides, towards the pipe, into the putty composite.
4. The firestop sleeve thus formed is pushed through the wall until the sleeve extends out equally on each side.
5. The annular space between the firestop sleeve and the wall can then be caulked about ⅝ inch thick—with a ¼ inch crown, or so, on each side of the wall.

As will be apparent, no securement tabs, as of a kind shown by reference notation 28 are employed.

For a concrete floor, wall or ceiling assembly—especially one where a large annular space exists where the pipe run is involved—, the installation procedure could be as follows:

1. The galvanized firestop sleeve is wrapped around the pipe above the floor, with the moldable putty and poly-plastic side facing the pipe. As before, the putty material joins together, and the bare metal end 70 overlaps about 4".
2. The firestop sleeve is secured around the pipe by again wrapping tape about it—although a pop rivet or hose clamp may be utilized instead. Experience has shown that the tape could be of a ¾ inch glass cloth electrical tape variety, for instance.
3. The retaining tabs 60 are again bent around the firestop sleeve on both sides, towards the pipe.
4. The firestop sleeve can then be pushed down through the floor (as an example), so that the sleeve extends above the floor approximately 3".
5. Where the annular space is greater than ¼ inch, a backing material can be compressed into the annular space, and recessed a minimum of ½ inch. Such backing material can be a mineral wool, or the Trademarked material BACKAROD.
6. Depending upon whether mineral wool or BACKAROD is employed, the cavity that remains can be filled with a ¼" to 1" caulking material, with a ¼" crown around the firestop sleeve.

As with the gypsum wallboard assembly with the firestop sleeve of the invention, no attachment tabs are required. And, as with the gypsum wallboard assembly, the firestopping is provided at both sides of the wall, floor or ceiling, in a singular operation, without having to proceed first from one side, then to the other, as with the installation of the U.S. Pat. No. 5,498,466 firestop of FIG. 1.

While there have been described what are considered to be preferred embodiments of the invention, it will be readily appreciated by those skilled in the art that modifications can be made without departing from the scope of the teachings herein. Thus, while the intumescent composite of the previously noted United States patent has been indicated as being a preferred intumescent material in this construction of the invention, other intumescent composites may be employed with the percentages of components different from that listed in U.S. Pat. No. 5,498,466. Other intumescent components that may be used might include blowing agents, char promoters, and/or different binders other than those which characterize the intumescent composite of U.S. Pat. No. 5,498,466, and may be utilized with the firestop sleeve of the invention equally as well. But, as will be also appreciated, no matter what the final composition of the intumescent moldable putty might be, the end result with the present invention will be seen to be less labor intensive than with the firestop device of the prior art, resulting in a less expensive firestop to fabricate and install for use. For at least such reasons, resort should be had to the claims appended hereto for a true understanding of the scope of the invention.

We claim:

1. A firestop sleeve comprising:
   a restraining layer having an overlying poly-plastic band exhibiting top, bottom and opposing side edges;
   a layer of intumescent composite abutting said poly-plastic band;
   a plurality of tabs extending outwardly from said side edges of said poly-plastic band;
   with said restraining layer and said poly-plastic band being pliable for rolling toward one another when furled;
   with said layer of intumescent composite forming a moldable putty;
   and with said plurality of tabs being bendable to compress into said putty in holding said restraining layer in position.

2. The firestop sleeve of claim 1 wherein said restraining layer is formed of galvanized steel.

3. The firestop sleeve of claim 2 wherein said layer of intumescent composite covers substantially the same area as that covered by said poly-plastic band.

4. The firestop sleeve of claim 3 wherein said intumescent layer is of a given thickness, and wherein said plurality of tabs extend outwardly from said side edges of said poly-plastic band a distance substantially equal to said thickness of said intumescent layer.

5. The firestop sleeve of claim 4 wherein there is also included a further bendable tab extending outwardly from at least one of said top and bottom edges of said poly-plastic band.

6. The firestop sleeve of claim 5 wherein said plurality of tabs are each of a first width, wherein said further bendable tab is of a second width, and wherein said second width is several times greater than said first width.

7. The firestop sleeve of claim 6 wherein said restraining layer and said layer of intumescent composite are of a length at least 8".

8. The firestop sleeve of claim 1 wherein said layer of intumescent composite covers substantially the same area as that of said poly-plastic band.

9. The firestop sleeve of claim 1 wherein said intumescent layer is of a given thickness, and wherein said plurality of tabs extend outwardly from said side edges of said poly-plastic band a distance substantially equal to said thickness of said intumescent layer.

10. The firestop sleeve of claim 1 wherein there is also included a further bendable tab extending outwardly from at least one of said top and bottom edges of said poly-plastic band.

11. The firestop sleeve of claim 10 wherein said plurality of tabs are each of a first width, wherein said further bendable tab is of a second width, and wherein said second width is several times greater than said first width.

12. The firestop sleeve of claim 1 wherein said restraining layer and said layer of intumescent composite are of a length at least 8".

* * * * *